United States Patent [19]

Ohnishi

[11] 4,285,047
[45] Aug. 18, 1981

[54] DIGITAL ADDER CIRCUIT WITH A PLURALITY OF 1-BIT ADDERS AND IMPROVED CARRY MEANS

[75] Inventor: Makoto Ohnishi, Tokyo, Japan
[73] Assignee: Hitachi, Ltd., Tokyo, Japan
[21] Appl. No.: 84,457
[22] Filed: Oct. 12, 1979
[30] Foreign Application Priority Data
Oct. 25, 1978 [JP] Japan .................... 53-130565
[51] Int. Cl.³ .................................................. G06F 7/50
[52] U.S. Cl. ................................................... 364/785
[58] Field of Search ...................................... 364/785
[56] References Cited
U.S. PATENT DOCUMENTS

| 3,291,973 | 12/1966 | Rasche | 364/785 |
| 3,454,751 | 7/1969 | Brastins et al. | 364/785 X |
| 3,941,990 | 3/1976 | Rabasse | 364/785 |

*Primary Examiner*—David H. Malzahn
*Attorney, Agent, or Firm*—Craig and Antonelli

[57] ABSTRACT

A digital adder comprises at least two, first and second 1-bit adders; first and second carry circuits which store therein output signals of carry output terminals of said first and second adders and apply them to carry input terminals of said first and second adders, respectively, in response to a predetermined clock signal; first input means for applying each pair of a plurality of pairs of data to be added up and each consisting of a predetermined number of bits, to said first adder in 1-bit sequence from least significant bits of said each pair of data in response to said clock signal; second input means for applying the data to be added to the carry signal delivered from said first adder by the addition of most significant bits of said each pair of data, to said second adder in 1-bit sequence from the least significant bits in response to said clock signal and upon termination of the application of said pair of data to said first adder; a first gate circuit which inhibits the carry signal delivered from said first adder by the addition of the most significant bits of said each pair of data, from being applied to said first carry circuit and applies said carry signal to said second carry circuit; and means for combining outputs of said first and second adders so as to attach the output of said second adder onto a more significant bit side of the output of said first adder and for delivering the combined output as one data.

7 Claims, 23 Drawing Figures

DIGITAL ADDER CIRCUIT WITH A PLURALITY OF 1-BIT ADDERS AND IMPROVED CARRY MEANS

BACKGROUND OF THE INVENTION

This invention relates to a digital adder.

Digital adders include serial adders and parallel adders. With the serial adder, the product between the number of data bits and the number of times of data processings becomes a clock rate, and the processing of data at a bit rate higher than the clock rate cannot be realized. In such case, the parallel adder is employed. With the parallel adder, however, that number of full adders which is equal to the number of data bits are required, and the number of constituent elements increases. Another problem is that, since an operation must be completed within one clock period, carry needs to be executed at high speed.

SUMMARY OF THE INVENTION

This invention has for its object to provide an adder which can process data with a serial adder and at a bit rate higher than a clock rate.

In order to accomplish the object, this invention comprises at least first and second adders and means for applying to a carry circuit of said second adder that one of the carry outputs produced by said first adder which has been generated by an addition of most significant bits of data to be added. Also provided are means for applying to said second adder data which is to be added to said one carry output and for making the timing of this application later than the application of said one carry output of said first adder to said carry circuit of said second adder, and means for delivering outputs of said first and second adders upon combining them so that said output of said first adder may lie on a less significant bit side of said output of said second adder.

DETAILED DESCRIPTION OF THE PREFERRED EMBODIMENTS

Figure 1:
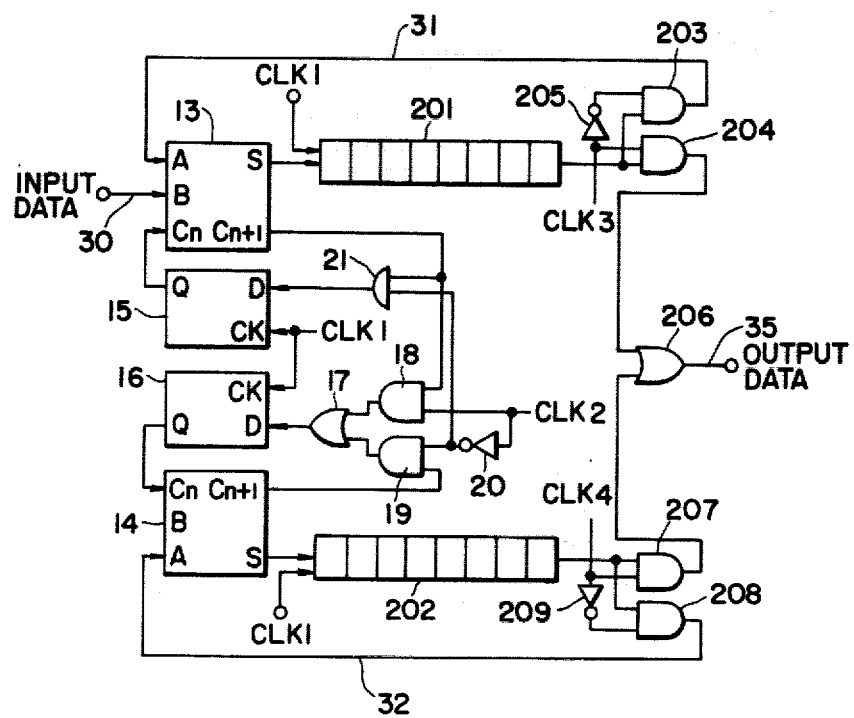
FIG. 1 is a circuit diagram showing a first embodiment of this invention.
Figure 2:
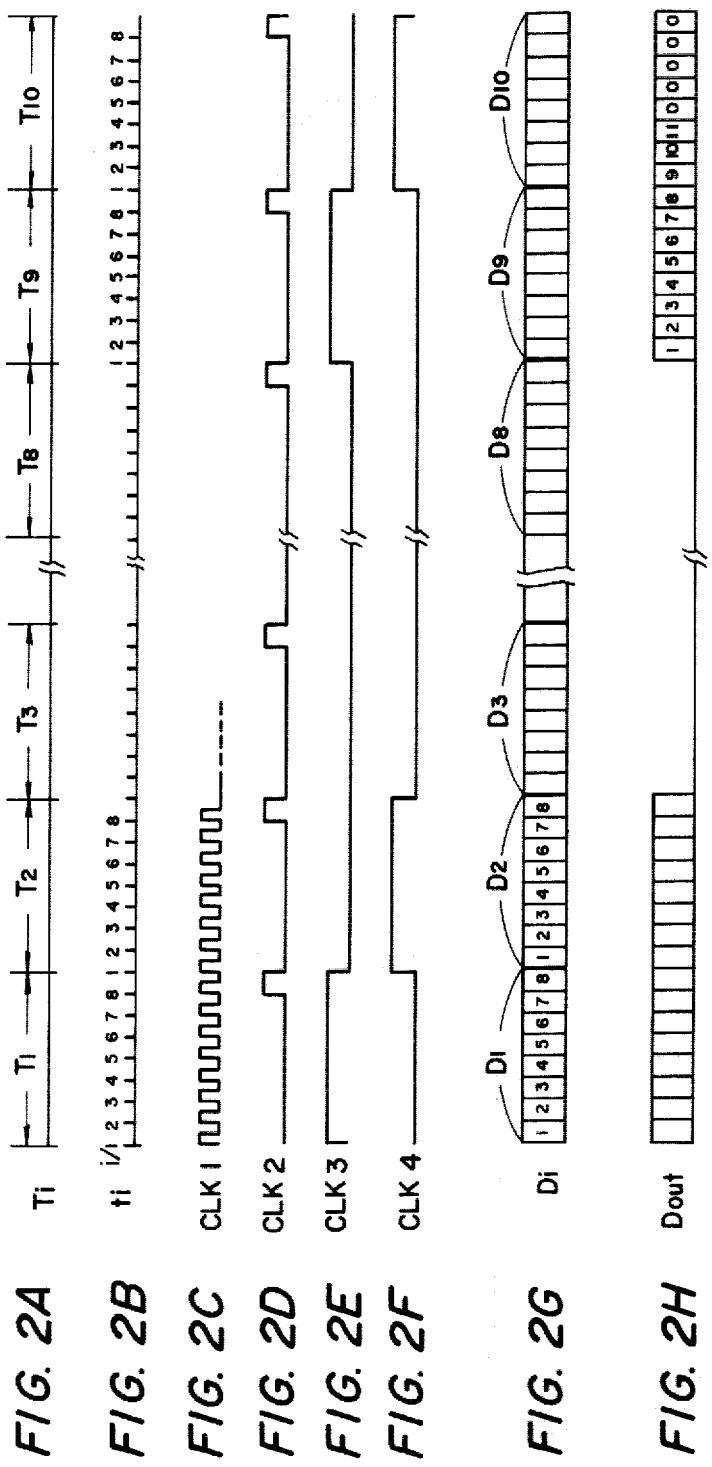
FIGS. 2A to 2H are time charts for explaining the operation of the circuit in FIG. 1.

FIG. 1 is a circuit diagram which shows an embodiment of this invention.

The circuit of the present embodiment is such that the invention is applied to an adder circuit in which, in order to demultiply the sampling frequency of digital data, a plurality of data are added so as to read out the added result at a lower sampling frequency.

By way of example, there will be explained a case where 8-bit digital data at a sampling frequency of 256 kHz are added eight times so as to obtain digital data at a sampling frequency of 32 KHz. Since the data are added eight times, the number of bits of the output data becomes 11 bits being 3 bits larger than the number of input bits. The operating speed of the adder as is therefore required becomes 256 kHz×11 bits=2.816 Mbits/s. On the other hand, the bit rate of the input data is 256 kHz×8 bits=2.048 Mbits/s. It is accordingly apparent that when the clock rate is set at 2.048 MHz, no operation can be executed by a prior-art method which employs a single serial adder.

Hereunder, the operation of the device shown in FIG. 1 will be described with reference to time charts of FIGS. 2A to 2H.

In FIG. 1, an adder 13 and a D-type flip-flop (FF) 15, and an adder 14 and a D-type FF 16 form serial adders, respectively. The FFs 15 and 16 construct carry circuits for the corresponding adders 13 and 14. The terminal B of the adder 14 for data input is not used in the first embodiment. Eight input data $D_1$-$D_8$ to be added up (refer to FIG. 2G) are continuously applied to the terminal B of the adder 13 through a line 30. Each input data is applied from the least significant bit to the most significant bit in 1-bit succession in synchronism with a clock signal $CLK_1$ which rises at times $t_1$-$t_8$ (refer to FIG. 2B). For example, the input data $D_1$ is applied every bit at the times $t_1$-$t_8$ within a period $T_1$ (refer to FIG. 2A). Likewise, the input data $D_2$-$D_8$ are respectively applied within periods $T_2$-$T_8$. The signal $CLK_1$ (refer to FIG. 2C) is selected at 2.048 MHz in this example. The signal $CLK_1$ consists of pulses which rise at the respective time $t_i$ and which fall halfway between the times $t_i$ and $t_{i+1}$. In the period $T_1$, no data is applied to the terminal A of the adder 13 through a line 31 as will be stated later. At the time $t_1$ of each period $T_i$ ($i=1-8$), the D-type FF 15 for storing a carry signal provides "0" as will be stated later. Accordingly, the terminal $C_n$ of the adder 13 for receiving the carry signal receives "0" at the time ($T_1$, $t_1$). Here, the time ($T_1$, $t_1$) represents the time $t_1$ within the period $T_1$. Likewise, the time $t_j$ ($j=1-8$) within the period $T_i$ shall be represented by the time ($T_i$, $t_j$). In consequence of the above, the data $D_1$ applied to the adder 13 is delivered as it is from the output terminal S of the adder 13. The carry signal $C_{n+1}$ remains at "0". The bits of the delivered data $D_1$ are serially applied one by one to an 8-bit shift register (SR) 201 which is operatively synchronized with the signal $CLK_1$. In this way, all the bits of the data $D_1$ are stored into the SR 201 before the time ($T_2$, $t_1$). At the time ($T_2$, $t_1$), the next data $D_2$ begins to be applied to the terminal B of the adder 13 through the line 30. In the period $T_2$, a signal $CLK_3$ (refer to FIG. 2E) becomes a low level. The signal $CLK_3$ is a signal which has a period 8.T (T being the time width of the period $T_j$) and which becomes a high level during the period $T_1$. As a result, an inverter 205 and an AND gate 203 apply the series output of the SR 201 to the terminal B of the adder 13 through the line 31. An AND gate 204 is disabled. In this way, the addition between the data $D_1$ and $D_2$ is executed by the adder 13 during the period $T_2$. In the adding operation, a signal $CLK_2$ (refer to FIG. 2D) lies at the low level during an interval from the time ($T_2$, $t_1$) to the time ($T_2$, $t_7$). The signal $CLK_2$ is a signal of a period T which has the high level from a time somewhat behind the time ($T_i$, $t_8$) to a time somewhat behind the time ($T_{i+1}$, $t_1$). In consequence, an AND gate 21 is in the status in which it is enabled by the output of an inverter 20 during the aforecited interval. Accordingly, the carry signal which is produced at the terminal $C_{n+1}$ by the additions of the first to seventh bits of the respective data $D_1$ and $D_2$ is stored in the FF 15, and is used for the addition of the next bits. When the addition of the eighth bits of the respective data $D_1$ and $D_2$ has terminated at the time ($T_2$, $t_8$), the carry signal produced at this addition is stored into the D-type FF 16 at the time ($T_3$, $t_1$). Since the signal $CLK_2$ rises somewhat later than the time ($T_i$, $t_8$) and falls somewhat later than the next time ($T_{i+1}$, $t_1$), it lies at the high level at the time ($T_3$, $t_1$). At this time ($T_3$, $t_1$), accordingly, the AND gate 21 is disabled whereas an AND gate 18 is enabled. Consequently, the carry signal produced by the addition at the time ($T_2$, $t_8$) is stored into the FF 16 through an OR gate 17 at the time ($T_3$, $t_1$). The resultant output of the FF 16 is used for the addition of the adder 14 as will be stated later. In the same manner, in the periods $T_3$-$T_8$, the data $D_3$-$D_8$ are successively added to the data contained in the SR 201, and the carry signals produced by the additions of the most significant bits, the eighth bits at the times ($T_i$, $t_8$) within these periods are respectively stored into the FF 16 at the times ($T_{i+1}$, $t_1$). When the period $T_9$ begins upon termination of the period $T_8$, the signal $CLK_3$ becomes the high level. Therefore, the AND gate 204 is enabled, and the data in the SR 201 has its bits delivered onto a line 35 through an OR gate 206 in series (refer to FIG. 2H). This output data includes eight less-significant bits in the added value of the data $D_1$-$D_8$. During the data output operation, the gate 203 is disabled, so that the output of the SR 201 is not applied to the adder 13.

On the other hand, the carry signals stored in the FF 16 at the times ($T_i$, $t_1$) (i=2−8) are applied to the carry signal input terminal $C_n$ of the adder 14 and are added up.

In the period $T_2$, a signal $CLK_4$ (refer to FIG. 2F) lies at the high level, so that an AND gate 208 is disabled by the output of an inverter 209. The signal $CLK_4$ is a signal of a period 8.T which becomes the high level during the period $T_2$. In the period $T_2$, accordingly, no data is applied to the terminal A of the adder 14 through a line 32. Meanwhile, the carry signal generated from the adder 13 at the time ($T_2$, $t_8$) is stored into the FF 16 at the time ($T_3$, $t_1$) and delivered therefrom. Since, in this manner, no data is applied to the terminal A or terminal $C_n$ of the adder 14 during the period $T_2$, "0"s of eight bits are put in series into an 8-bit SR 202 which operates in synchronism with the signal $CLK_1$. Upon lapse of the period $T_2$, the signal $CLK_4$ becomes the low level, so that an AND gate 207 is disabled and that the AND gate 208 is enabled by the output of the inverter 209. Accordingly, the data in the SR 202 has its bits put in series into the adder 14 through the line 32. As a result, the carry signal produced by the addition of the eighth bits of the respective data $D_1$ and $D_2$ is applied to the SR 202 as it is. In the same manner, the carry signals produced in the adder 14 at the times ($T_i$, $t_1$) (i=4−9) are sequentially added to the data in the SR 202. By way of example, it is assumed that the carry signals have been generated from the adder 13 successively at the times ($T_2$, $t_8$), ($T_3$, $t_8$) and ($T_4$, $t_8$). At the time ($T_3$, $t_2$), the data in the SR 202 becomes "10000000". At the beginning of the period $T_4$, accordingly, the data in the SR 202 becomes "00000001". Subsequently, at the time ($T_4$, $t_1$), the least significant bit "1" in the above data is applied from the SR 202 to the adder 14, and the carry signal generated in the adder 13 at the time ($T_3$, $t_8$) is applied from the FF 16. Accordingly, the addition output S of the adder 14 is "0", and the carry output $C_{n+1}$ thereof becomes "1". At the next time ($T_4$, $t_2$), the signal $CLK_2$ lies at the low level. In consequence, the AND gate 18 is disabled, whereas the AND gate 19 is enabled by the output of the inverter 20. Accordingly, the carry signal $C_{n+1}$ generated in the adder 14 by the addition at the time ($T_4$, $t_1$) is stored into the FF 16 at the time ($T_4$, $t_2$) and is immediately delivered. Since the next code to be applied from the SR 202 to the adder 14 at this time is "0" in the present example, the addition output S of the adder 14 becomes "1" and the carry output $C_{n+1}$ thereof becomes "0". Thereafter, all the codes to be applied to the adder 14 are "0" within the period $T_4$. At the beginning of the period $T_5$, accordingly, data "00000010" which is the added value of the two carry outputs is stored in the SR 202. Likewise, the carry output thereafter generated from the adder 13 at the time ($T_4$, $t_8$) is added to the data in the SR 202, and the data stored in the SR 202 at the beginning of the period $T_6$ is equal to the added value of the carry outputs generated in the adder 13 before that time. In this way, the summation of the carry outputs generated in the adder 13 within the periods $T_2$-$T_8$ is stored in the SR 202 at the beginning of the period $T_{10}$. In the period $T_{10}$, the signal $CLK_4$ lies at the high level, so that the data in the SR 202 has its bits delivered in series onto the line 35 through the AND gate 207 as well as the OR gate 206. As stated previously, the eight bits in the added value of the data $D_1$-$D_8$ contained in the SR 201 are delivered in the peroiod $T_9$. Therefore, the output from the SR 202 provides data of three more significant bits following the eight bits. In this manner, the data $D_{out}$ of eleven bits is delivered from the OR gate 206 every eighth period (refer to FIG. 2H). In and after the period $T_9$, the addition of the next new eight data $D_9$-$D_{16}$ is similarly carried out.

As apparent from the foregoing, the carry signal generated in the period $T_{i+1}$ by the addition of the data $D_i$ and $D_{i+1}$ (i=1−7) in the adder 13 is added to the summation of the carry outputs till then in the adder 14 in the next period $T_{i+2}$. In this manner, the addition of the data and the addition of the carry outputs produced by the first-mentioned addition are executed by means of the different adders and at shifted times, whereby the added data can be obtained with the serial adder at a rate higher than the clock rate for the addition.

In the arrangement of FIG. 1, the following measure may well be taken in order to prevent the carry signal from entering the FF 15, said carry signal being generated by the addition in the adder 13 between the eighth bits of the most significant bits of the input data. That is, the output lines of the AND gate 21 and the inverter 20 for controlling this gate "on" and "off" are removed and the carry output $C_{n+1}$ of the adder 13 is directly connected to the terminal D of the FF 15, whereupon the signal $CLK_2$ is applied to the reset terminal (not shown) of the FF 15. In this case, the FF 15 is reset at the time ($T_i$, $t_1$), and hence, the carry output of the adder 13 is not applied to the FF 15.

Figure 3:
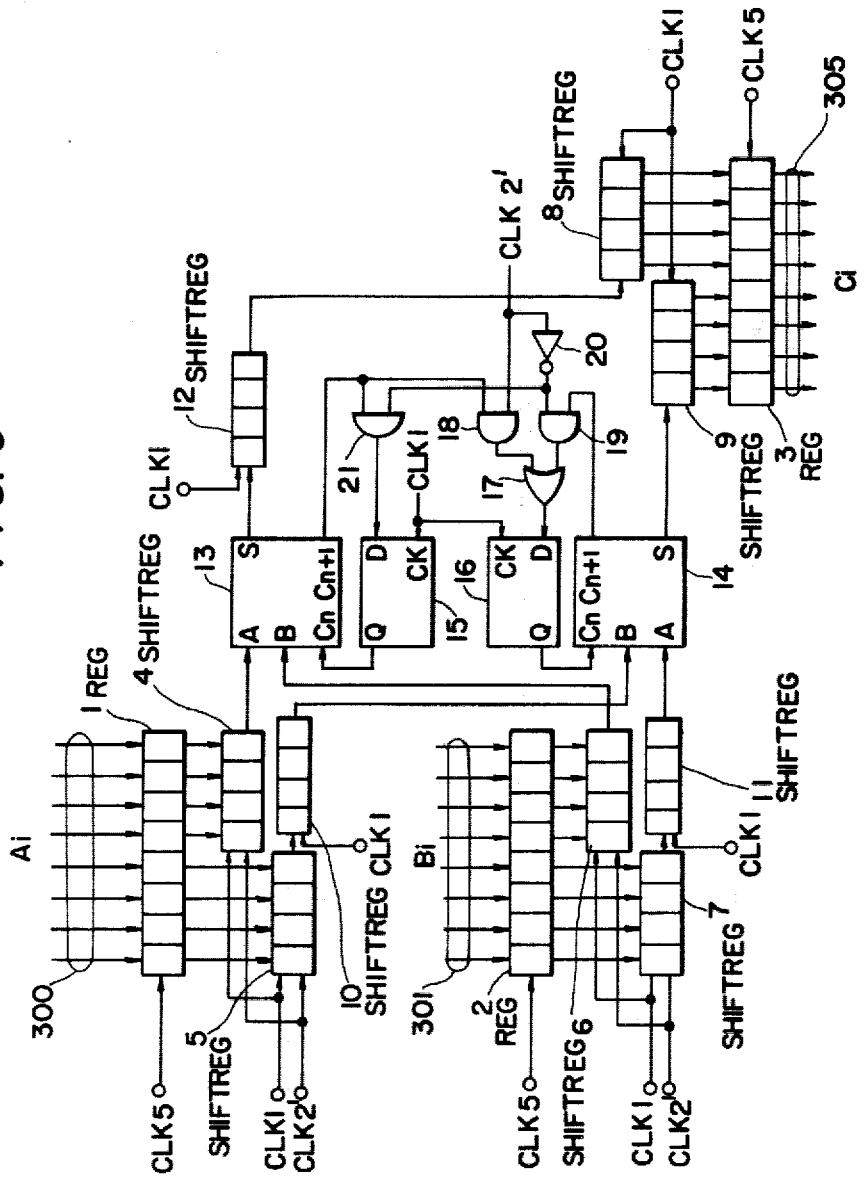
FIG. 3 is a circuit diagram showing a second embodiment of this invention.

FIG. 3 shows a second embodiment of this invention, while FIGS. 4A to 4M are time charts of signals for explaining the operation of the circuit in FIG. 3.

The device of FIG. 3 is such that the invention is applied to an adder which adds a plurality of pairs of 8-bit input data $A_i$ and $B_i$ in succession and which provides addition outputs $C_i$. Here, i=1, 2, . . . .

In this figure, reference numerals 13, 14, 15, 16, 17, 18, 19, 20 and 21 and symbol $CLK_1$ indicate the same components as in FIG. 1. However, the adder 14 differs from that of FIG. 1 in that a data is also applied to the terminal B in FIG. 3. For the following explanation, the time at which the clock signal $CLK_1$ shown in FIG. 4C rises shall be represented as the time $t_i'$ (i=1−4) as indicated in FIG. 4B, and one period from the time $t_1'$ to the next time $t_1'$ shall be represented as $T_j'$ (j=1, 2, . . .

Figure 4A:
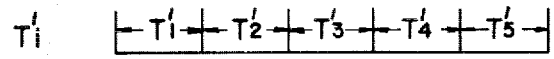
FIGS. 4A to 4M are time charts of signals for explaining the operation of the circuit in FIG. 3.
Figure 4B:
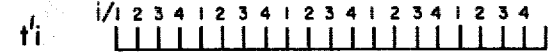
Figure 4C:
Figure 4D:
Figure 4E:
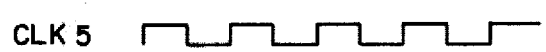

) (refer to FIG. 4A). The time $t_1'$ in the period $T_j'$ shall be denoted as $(T_j', t_i')$.

Figure 4F:
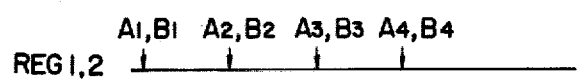
Figure 4G:
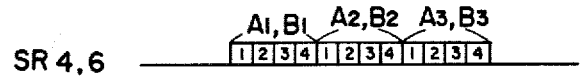
Figure 4H:
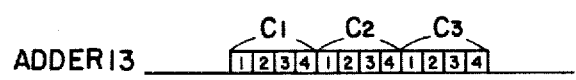
Figure 4I:
Figure 4J:
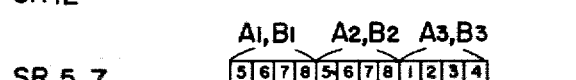
Figure 4K:
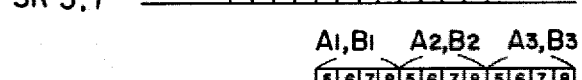
Figure 4L:
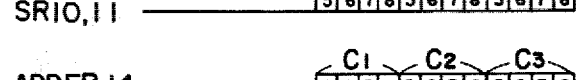
Figure 4M:

A pair of data $A_1$ and $B_1$ to be added up are respectively stored into parallel input registers 1 and 2 through lines 300 and 301 in response to the rise of a clock signal $CLK_5$ at the time $(T_1', t_1')$. FIG. 4F shows the times at which the data $A_1$–$A_4$ are sequentially applied to the register 1. The clock signal $CLK_5$ is a signal which is obtained by dividing the frequency of the signal $CLK_1$ by four, and which rises at the time $t_1'$ and falls at the time $t_3'$. Less significant 4 bits and more significant 4 bits among the parallel outputs of the register 1 are respectively stored into 4-bit shift registers 4 and 5 in response to signals $CLK_1$ and $CLK_2'$. Likewise, less significant 4 bits and more significant 4 bits among the parallel outputs of the register 2 are respectively stored into 4-bit shift registers 6 and 7 in response to the signals $CLK_1$ and $CLK_2'$. The signal $CLK_2'$ is a signal which rises somewhat later than the time $(T_i', t_4')$ and which falls somewhat later than the time $(T_{i+1}', t_1')$. The SRs 4, 5, 6 and 7 store the parallel inputs of 4 bits thereinto with the high level of the signal $CLK_2'$ at the time when the signal $CLK_1$ rises, that is, at the time $(T_i', t_1')$, and they thereafter shift the stored signals in synchronism with the signal $CLK_1$. As exemplified in FIG. 4G, accordingly, the less significant 4 bits of the data $A_1$ and $B_1$ are sequentially delivered out of the SRs 4 and 6 from the least significant bit sides at the times $t_1'$–$t_4'$ within the period $T_2'$ and are respectively applied to the terminals A and B of the adder 13. On the other hand, the more significant 4 bits of the data $A_1$ and $B_1$ are applied from the least significant bit sides to 4-bit delay shift registers 10 and 11 responsive to the signal $CLK_1$ out of the SRs 5 and 7 at the times $t_1'$–$t_4'$ within the period $T_2'$ and are applied to the terminals B and A of the adder 14 four periods of the signal $CLK_1$ later, respectively. FIG. 4J indicates the times at which the more significant 4 bits of the data $A_1$ and $B_1$ are provided from the SRs 5 and 7, while FIG. 4K indicates the times at which the more significant 4 bits of the data $A_1$ and $B_1$ are provided from the SRs 10 and 11. The addition outputs S of the less significant 4 bits of the data $A_1$ and $B_1$ applied to the adder 13 (refer to FIG. 4H) are successively applied to a delay shift register 12 responsive to the signal $CLK_1$. As a result, as shown in FIG. 4I, the less significant 4 bits of the added value $C_1$ are successively delivered from the SR 12 at the times $t_1'$–$t_4'$ within the period $T_3'$. During the additions of the less significant 3 bits of the data $A_1$ and $B_1$, the signal $CLK_2'$ is at the low level, and hence, the AND gate 21 is kept enabled by the output of the inverter 20. Accordingly, the carry output $C_{n+1}$ produced by the additions of the less significant 3 bits of the data $A_1$ and $B_1$ is stored into the D-type FF 15 through the AND gate 21 and is utilized as the carry input $C_n$ to the adder 13. Meanwhile, the carry output $C_{n+1}$ generated by the additions of the least significant bit to the fourth bits of the data $A_1$ and $B_1$ is not applied to the FF 15, but is applied to the D-type FF 16. More specifically, at the time $(T_3', t_1')$ at which the carry output $C_{n+1}$ is to be applied to the FF 15 by the addition of the fourth bits, the signal $CLK_2'$ is at the high level. Therefore, the AND gate 21 is in the disabled status owing to the output of the inverter 20. On the other hand, the AND gate 18 is in the enabled status. Accordingly, the carry output $C_{n+1}$ produced by the addition of the fourth bits is stored into the FF 16 through the AND gate 18 as well as the OR gate 17. In the period $T_3'$ after lapse of the period $T_2'$ in which the additions of the less significant 4 bits of the data $A_1$ and $B_1$ terminate in the manner described above, the more significant 4 bits of the data $A_1$ and $B_1$ are delivered from the SRs 10 and 11 as illustrated in FIG. 4K, and the more significant 4 bits of the addition output $C_1$ are delivered as illustrated in FIG. 4L. The carry output which has been produced as the result of the addition of the fourth bits on the less significant sides in the data $A_1$ and $B_1$ and which is stored in the FF 16 is used as the carry signal at the addition of the fifth bits of the data $A_1$ and $B_1$ on the less significant sides because the fifth bits are applied to the adder 14 from the SRs 10 and 11 at the time $(T_3', t_1')$. Accordingly, the added outputs of the adders 13 and 14 as combined become the added value of the data $A_1$ and $B_1$. The outputs of the adder 14 are successively and serially applied to an SR 9 responsive to the signal $CLK_1$ in the period $T_3'$. On the other hand, the outputs of the adder 13 are delayed by the 4-bit SR 12, whereupon they are successively and serially applied to an SR 8 responsive to the signal $CLK_1$ in the same period $T_3'$. The parallel outputs of the SRs 8 and 9 are respectively stored into the less significant 4-bit area and more significant 4-bit area of a register 3 in response to the rise of the signal $CLK_5$ at the time $(T_4', t_1')$, and they are delivered as the added value $C_1$ of the data $A_1$ and $B_1$ through lines 305 (refer to FIG. 4M).

The carry output $C_{n+1}$ of the adder 14 produced by the addition of the most significant bits of the data $A_1$ and $B_1$ is not stored into the FF 16 for the reason that at the time $(T_4', t_1')$ at which the FF 16 is to store this carry output thereinto, the signal $CLK_2'$ is at the high level, resulting in disabling the AND gate 19 through the output of the inverter 20.

The next data $A_2$ and $B_2$, $A_3$ and $B_3$, etc. to be added subsequently to the addition of the data $A_1$ and $B_1$ are respectively put into the registers 1 and 2 at times which are four periods of the signal $CLK_1$ later than the input operation of the data $A_1$ and $B_1$ in succession.

As described above, each of the data to be added up is divided into the two small data in dependence on the digits, the small data are respectively applied to the SRs, the outputs of the SRs storing the small data on the lower digit sides therein are applied to the first adder without delay, the outputs of the SRs storing the small data on the higher digit sides therein are applied to the second adder through the SRs which serve to delay these small data the period of time required for the additions of the small data on the lower digit sides, the output of the first adder is delayed the period of time required for the additions of the small data on the higher digit sides, and among the carry signals produced in the additions of the small data on the lower digit sides the carry output generated by the addition of the highest digit bits in the small data on the lower digit sides is applied as the carry signal at the addition of the lowest digit bits in the small data on the higher digit sides, whereby the addition data can be obtained at the bit rate being twice as high as the period of the clock signal $CLK_1$ which determines the timings of the additions.

This invention is not restricted to the case where each of the data to be added up is divided into the two small data as in the second embodiment. In general, the invention is applicable to a case where each of the data to be added up is divided into N small data. In this case, the following measure may be taken. N adders are disposed. Letting $T_o$ denote the period of time required for the addition of the respective small data, the n-th ($1 \leq n \leq N$)

small data as viewed from the least significant bit sides are applied to the adder for these small data through delay elements having a delay time of $(n-1) \times T_o$, and the output of the adder is delivered through a delay element having a delay time of $(N-n) \times T_o$. Upon completion of the addition of the N-th small data, the added results are combined within a register and are delivered in parallel. The data to be added up are applied to the register in parallel at the intervals of the period $T_o$.

What is claimed is:

1. A digital adder comprising:
   first and second 1-bit adders, each of which includes data input terminals, an addition output terminal, a carry input terminal and a carry output terminal;
   first and second carry circuits respectively connected between the carry input and the carry output terminals of the first and second adders to respectively store therein output signals of the carry output terminals of said first and second adders in response to a predetermined first clock signal and to respectively apply them to the carry input terminals of said first and second adders;
   first input means for applying at least a portion of each pair of a plurality of pairs of data to be added up and each consisting of a predetermined number of bits, to said first adder in 1-bit sequence from least significant bits of said each pair of data in response to said first clock signal;
   a first gate circuit which permits storage of said carry signals of said first and second adders in said first and second carry circuits, respectively, when a second clock signal is in a first state, and which inhibits the carry signal delivered from said first adder by the addition of the most significant bits of said each pair of data from being applied to said first carry circuit and applies said carry signal from said first adder to said second carry circuit when said second clock signal is in a second state, wherein said second carry circuit applies said carry signal from said first adder to the carry input terminal of said second adder;
   second input means for applying data to be added to the carry signal delivered from said first adder to said second adder through the first gate circuit and the second carry circuit by the addition of most significant bits of said each pair of data, wherein the data to be added to this carry signal is in 1-bit sequence from the least significant bits in response to said first clock signal and upon termination of the application of said pair of data to said first adder; and
   means for combining outputs of said first and second adders so as to attach the output of said second adder onto a more significant bit side of the output of said first adder and for delivering the combined output as one data.

2. A digital adder as defined in claim 1, wherein:
   said first input means comprises means connected with one of a pair of data input terminals of said first adder and for applying in response to said first clock signal the plurality of predetermined data to be added up and each having the predetermined number of bits;
   a first shift register is connected with an addition output terminal of said first adder, which has a capacity equal to said predetermined number of bits and which shifts the addition output of said first adder in response to said first clock signal; and
   a second shift register is connected with an addition output terminal of said second adder, which has a capacity equal to said predetermined number of bits and which shifts the addition output of said second adder in response to said first clock signal.

3. A digital adder as defined in claim 1, wherein:
   said first input means comprises means for applying a pair of first small data composed of a predetermined number of bits being a part on the less significant side in each of the plurality of pairs of data to be added up, to said first adder in 1-bit sequence from the least significant bits;
   said second input means comprises means for applying a pair of second small data following said first small data of said each pair of data and composed of said predetermined number of bits, to said second adder in 1-bit sequence from bits on the less significant sides of said second small data after termination of the application of all bits of said first small data to said first adder; and
   said means for combining outputs comprises a first shift register which delays the addition output of said first adder in response to said first clock signal until said second small data have been applied to said second adder, and means for combining an output of said first shift register with said output of said second adder and delivering the combined output.

4. A digital adder as defined in claim 3, wherein:
   said first input means comprises first and second registers to which the pair of data to be added up are respectively applied, second and third shift registers which respond to said first clock signal and to which said first small data in parallel outputs of said first and second registers are respectively applied in parallel, and means for applying series outputs of said second and third shift registers to said first adder;
   said second input means comprises fourth and fifth shift registers which respond to said first clock signal and to which said second small data in said parallel outputs of said first and second registers are respectively applied in parallel, sixth and seventh shift registers which respond to said first clock signal, each of which has a capacity equal to the number of bits of said first small data and to which series outputs of said fourth and fifth shift registers are respectively applied, and means for applying serial outputs of said sixth and seventh shift registers to said second adder; and
   said means for combining outputs comprises eighth and ninth registers which respond to said first clock signal, each of which has a capacity equal to that of said first shift register and to which the series outputs of said first shift register and said second adder are respectively applied, and a tenth register in which parallel outputs of said eighth and ninth registers are respectively applied to a less significant bit side area and a more significant bit side area thereof.

5. A digital adder comprising:
   first and second 1-bit adders, each of which includes data input terminals, an addition output terminal, a carry input terminal and a carry output terminal;
   a first carry circuit interposed between the carry output and the carry input terminals of said first adder, for storing therein a first carry signal from said carry output terminal of said first adder periodically in response to a first clock signal and for applying said stored first carry signal to said carry input terminal of said first adder;

second carry circuit interposed between the carry output and the carry input terminals of said second adder, for storing therein a second carry signal from said carry output terminal of said second adder periodically in response to said first clock signal and for applying said stored second carry signal to said carry input terminal of said second adder;

a first gate circuit connected to said first and second adders and said first and second carry circuits for permitting said first and second carry signals to be stored in said first and second carry circuits, respectively, when a second clock signal is in a first state, and for inhibiting said first and second carry signals from being stored in said first and second carry circuits, respectively and periodically when said second clock signal is in a second state, and for allowing said first carry signal to be stored in said second carry circuit periodically when said second clock signal is in said second state;

first and second shift registers respectively connected to the addition output terminals of said first and second adders for shifting addition outputs of said first and second adders, respectively and periodically in response to said first clock signal; and means connected to said first and second shift registers for periodically combining data stored in said first and second shift registers in such a manner that said data stored in said second shift register is attached onto a more significant bit side of said data stored in said first shift register.

6. A digital adder according to claim 5, further comprising:

a second gate circuit connected to a series output terminal of said first shift register for allowing a series output of said first shift register to be applied to one of the data input terminals of said first adder in response to a third clock signal while said third clock signal has a first level; and a third gate circuit connected to a series output terminal of said second shift register for allowing a series output of said second shift register to be applied to one of the data input terminals of said second adder in response to a fourth clock signal while said fourth clock signal has a first level;

wherein said combining means includes:

an OR gate;

a fourth gate circuit connected to the series output terminal of said first shift register for allowing a series output of said first shift register to be transferred to said OR gate in response to said third clock signal and while said third clock signal has a second level; and a fifth gate circuit connected to the series output terminal of said second shift register for allowing a series output of said second shift register to be transferred to said OR gate in response to said fourth clock signal while said fourth clock has a second level;

wherein said fourth clock signal changes from its first to its second levels immediately after said third clock signal changes from its first to its second levels, thereby allowing the series output of said second shift register to output from said OR gate in succession and after a series output of said first shift register is output from said OR gate.

7. A digital adder according to claim 5, further comprising:

first and second input registers for respectively receiving first and second data in parallel and periodically in response to a third clock signal;

third and fourth shift registers respectively connected to said first and second input registers for respectively and simultaneously receiving a first part on the less significant side of said first data within said first register and a first part on the less significant side of said second data within said second register, and for respectively shifting said stored first parts of said first and second data in response to said first clock signal to be respectively applied to first and second data input terminals of said first adder; and fifth and sixth shift registers respectively connected to said first and second input registers for respectively receiving a second part on the more significant side of said first data within said first register and a second part on the more significant side of said second data within said second register, and for respectively shifting said stored second parts of said first and second data in response to said first clock signal to be respectively applied to first and second data input terminals of said second adder after the application of all bits of said first parts of said first and second data to said first adder, and wherein said storing of said first carry signal is done when all bits of said first parts of said first and second data are applied to said first adder;

wherein said combining means comprises:

a third register connected to said first and second shift registers for receiving parallel outputs thereof in parallel in response to a third clock signal after addition of said second parts of said first and second data within said second adder in such a manner that data stored in said second shift register is attached on the more significant side of said data stored in said first shift register outputting data stored therein in parallel.

* * * * *